May 24, 1927.                W. S. MOUNTFORD                1,630,241
                                 MOUSETRAP
                              Filed Dec. 6, 1923

William S. Mountford Inventor

By his Attorneys
Prindle, Wright & Small

Patented May 24, 1927.

1,630,241

UNITED STATES PATENT OFFICE.

WILLIAM S. MOUNTFORD, OF DUMONT, NEW JERSEY, ASSIGNOR TO WILLIAM DUBILIER, OF NEW YORK, N. Y.

MOUSETRAP.

Application filed December 6, 1923. Serial No. 678,806.

The objects of the invention are to provide a trap of the above character which will be simple and compact in structure, sensitive and reliable in its action, readily set, and which can be handled while in set or open position without likelihood that the jaw of the trap will be accidentally actuated.

Further objects and advantages of the invention will be in part obvious and in part specifically pointed out in the description hereinafter contained which, taken in connection with the accompanying drawings, discloses a preferred embodiment of the invention; such embodiment, however, is to be considered merely as illustrative of its principle. In the drawings.

Figure 1:
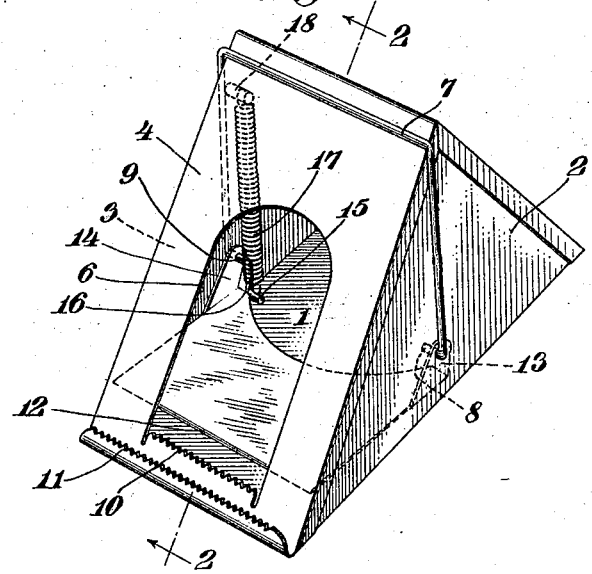
Fig. 1 is a perspective view of a mouse trap constructed in accordance with the invention.

If a mouse trap be constructed so that the tripping member thereof is exposed or improperly related to the jaw, the trap is likely to be actuated unintentionally during handling or adjustment of the trap, particularly if a careful positioning of the tripping member or location of the bait with reference thereto, is necessary.

According to the present invention, a housing or casing is employed, which in the drawings is illustrated as of triangular cross section, consisting of bottom wall 1, side walls 2 and 3, front and rear walls 4 and 5, and an entrance passage-way 6; the tripping member for the trap is located within the housing in such manner that as the mouse passes through passage-way 6 the tripping member is displaced and the jaw of the trap is actuated to move across the passage-way and confine the mouse against one wall thereof. As will appear more clearly as the description proceeds, the trap preferably is arranged so that manual adjustment of the tripping member, or careful location of the bait with regard thereto is unnecessary; and therefore since such member is entirely within and protected by the housing, the trap may be readily set or handled without likelihood of its being sprung accidentally to injure the operator.

Figure 2:
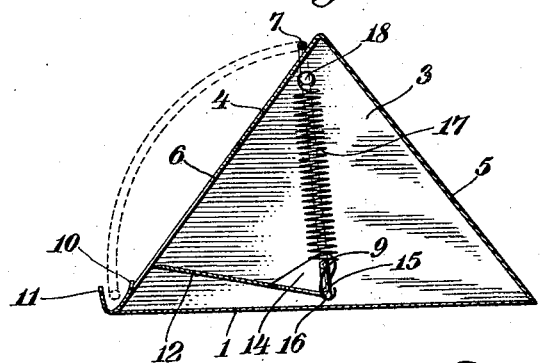
Fig. 2 is a sectional view taken on line 2—2 of Fig. 1.

In the illustrated embodiment, the jaw of the trap is in the form of a U-shaped lever 7, partially surrounding the housing, and having its ends 8 and 9 pivoted respectively in the side walls 2 and 3 thereof. In open or set position of the trap, lever 7 assumes the upper position shown in Figs. 1 and 2, from which position said lever moves downwardly across the entrance passageway 6 when the trap is sprung, thus confining the mouse against the bottom wall of such passageway. If desired, teeth 10 may be provided in such wall, and also a serrated flange 11 may be employed so as to impale the mouse upon such teeth or serrations when lever 7 is sprung.

The tripping member in the present instance consists of a plate 12 overlying the bottom wall 1 of the housing adjacent entrance passage-way 6, such plate being depressed when the mouse enters the housing through said passage-way 6, and being so related to the jaw member that the latter is simultaneously caused to be moved to closed position. As shown, the plate 12 is pivoted upon the ends 8 and 9 of lever 7, ears 13 and 14 being provided for this purpose, and the end 9 of lever 7 is provided with an interior projection 15 which engages a shoulder 16 on plate 12. Thus when the plate is depressed shoulder 16 moves projection 15 rearwardly, and the jaw member 7 is started toward closed position.

The jaw member 7 is moved to closed position with a snap action by means of a spring 17, which in the present instance is tensioned between projection 15 on the jaw and a fixed point 18 (Fig. 2) in the side wall 3 of the housing. It will be noted that, when the lever 7 is in open position the pull of spring 17 on projection 15 is substantially in line with the pivot point of such lever, and consequently the spring does not tend to move the lever; however, in all positions, except open position, the projection 15 is disposed rearwardly of pivot point 9, and thus spring 17 tends to move the lever forwardly across entrance passage-way 6 with progressively increasing force.

The housing ordinarily will be made of sheet metal, such as tin, and in use of the trap it is merely necessary to place the bait within the housing rearwardly of the tripping member, without any careful location of the bait with respect to the tripping member; and in setting the trap the tripping member need not be handled, since if lever 7 be moved to upright position, projection 15 will engage shoulder 16 on the tripping member and lift the latter slightly to set position. Thus the trap may be set without danger of accidental displacement of the tripping member which would spring the jaw 7 against the fingers of the operator. The adjustment of the trap may be regulated as sensitively as desired, by positioning lever 7 with the projection 15 in line with or slightly to the rear of pivot point 9, when a sensitive adjustment is desired, or by positioning the projection 15 slightly forwardly of pivot point 9 when a less sensitive adjustment is desired.

I prefer to provide a stop to engage the tripping member or jaw member to insure the desired adjustment thereof when the trap is set; in the present form the forward edge of the tripping member comes into engagement with wall 4 of the housing when lever 7 is moved to such position that the pull of spring 17 upon projection 15 of the lever 7, is toward pivot point 9, thus stopping the parts in proper set position.

While a specific embodiment of the invention has been described, it will be obvious that many changes may be made therein without departing from the principle of the invention, as defined in the following claims:

I claim:

1. A trap comprising a closed housing having an entrance passageway therein, a tripping member disposed adjacent said passageway, a jaw member comprising a pivoted lever clear of said passageway when in open position and movable across said passageway to closed position, a spring urging said jaw member toward closed position when the jaw member is in intermediate and closed position but not when said member is in open position, said jaw member and tripping member being provided with parts engaging to move the jaw member to an intermediate position when the tripping member is displaced, whereby the spring then moves the jaw member to closed position.

2. A mouse trap comprising a housing, an entrance passageway therein, a tripping member disposed adjacent said passageway and within said housing so as to be protected by the housing against actuation on all sides except through said entrance passageway, a spring-pressed jaw member clear of said passageway when in open position, and movable across said passageway to closed position, engaging parts being provided in connection with said jaw member and tripping member whereby displacement of the tripping member when the trap is in set position will move the jaw to permit the latter to pass across said entrance passageway to closed position and whereby movement of the jaw from closed position to open position will adjust said tripping member to set position.

3. A mouse trap comprising a housing, an entrance passageway therein, a tripping member disposed adjacent said passageway so as to be protected against actuation on all sides except through said passageway, a jaw member comprising a U-shaped lever enclosing a portion of the exterior of the housing and having its ends pivoted in opposite sides thereof, one of the ends of said lever being provided with a projection within the housing engaging said tripping member, whereby the lever is moved to an intermediate position when the tripping member is displaced, and a spring within the housing positioned to urge the lever to move the latter across said entrance passageway to closed position when the lever is in intermediate position, but not when in open position.

4. A mouse trap comprising a housing having an entrance passageway therein through one side wall thereof, a jaw member comprising a lever pivoted to the housing and movable across said entrance passageway to closed position, a plate pivoted in the housing and extending over the interior thereof adjacent said passageway, said lever being provided with a projection within the housing engaging said plate whereby movement of the plate will be transmitted to the lever, and a spring engaging said projection exerting tension on the lever substantially in the direction of its pivot when the lever is in open position, but in all other positions urging the lever to move the lever across said entrance passageway to closed position.

WILLIAM S. MOUNTFORD.